3,248,417
PRODUCTION OF DIMETHYL TEREPHTHALATE AND DIMETHYL ISOPHTHALATE FROM AN EVAPORATION RESIDUE RICH IN DIMETHYL ISOPHTHALATE
Gerhart Hoffmann, Witten-Rudinghausen, and Hans Nordiek and Walter Pohlmann, Witten (Ruhr), Germany, assignors to Chemische Werke Witten G.m.b.H., Witten (Ruhr), Germany
No Drawing. Filed Mar. 30, 1962, Ser. No. 183,723
Claims priority, application Germany, Apr. 15, 1961, C 23,889
8 Claims. (Cl. 260—475)

The present invention is directed to a process for the production of terephthalic acid dimethyl ester and isophthalic acid dimethyl ester, and more particularly to the efficient production of such esters, especially terephthalic acid dimethyl ester, from residue products enriched with isophthalic acid dimethyl ester, said residue products having been obtained as a result of the oxidation of p-xylene, and mixtures thereof with m-xylene, to the corresponding acids and the subsequent esterification of these acids to the corresponding diesters.

It is known that terephthalic acid dimethyl ester and/or isophthalic acid dimethyl ester may be prepared by the air oxidation of p- and/or m-xylene and esterification of the acids so produced. When operating in this manner, a xylene containing more than 96% p-xylene and less than 4% m-xylene is generally used; or a xylene, richer in meta-isomers, may be used as the starting product. In either case, a mixture of terephthalic acid dimethyl ester and isophthalic acid dimethyl ester is first obtained.

The terephthalic acid dimethyl ester can easily be separated from this mixture in pure form by crystallization in solvents. This separation is generally brought about by distilling the mixture of the esterified acids; the fraction of terephthalic acid dimethyl ester and isophthalic acid dimethyl ester thus obtained is recrystallized from suitable solvents, preferably methanol. When proceeding in this manner, the major part of the terephthalic acid dimethyl ester is precipitated and centrifuged, whereas the filtrate is evaporated to yield the crude isophthalic acid dimethyl ester.

The evaporation residue thus obtained consists of from 70–80% of a mixture of terephthalic acid dimethyl ester and isophthalic acid dimethyl ester in a ratio about 1:1 and 20–30% of a complex mixture of oxidation by-products. Another approximately 20–30% terephthalic acid dimethyl ester can be obtained from the soluble portion of the first recrystallization by a further recrystallization in methanol, whereby the oxidation by-products and the isophthalic acid dimethyl ester, as well as part of the terepthalic acid dimethyl ester, remain in solution. By subsequent concentration of the mother liquor, one obtains crystallizates containing, in addition to terephthalic acid dimethyl ester and isophthalic acid dimethyl ester, also larger quantities of oxidation by-products, which are, therefore, not technically useful. While a pure terepthalic acid-isophthalic acid dimethyl ester fraction can be obtained in a low yield by complete evaporation of the mother liquor and by fractional distillation of the evaporation residue in a tower having a diameter of 2.5 cm. and a height of 1.5 m. with a return ratio of 1:30, this procedure cannot be employed in practice in an economical manner.

It has now been surprisingly found that the oxidation by-products present in the evaporation residue, the evaporation residue being rich in isophthalic acid dimethyl ester as noted above, can be largely converted to the desired products if this residue is subjected to an oxidation with oxygen, or oxygen-bearing gases, at temperatures from 130–200° C., and preferably from 140–160° C., while adding thereto 0.02–0.1% of a cobalt or manganese salt soluble in the reaction mixture, preferably a salt of a fatty acid, and if the acids resulting from the oxidation are esterified with methanol. The residues used in the process of the present invention may be obtained from a single input through the air-oxidation process for the xylene mixture or by repeated recycling through the entire air-oxidation process. In the place of cobalt and manganese salts, other known catalysts for air oxidation, or mixtures of different catalysts, such as, for example, cerium and thallium salts, and also, copper, iron, zinc, titanium, chromium and nickel salts, may be used. The oxidation may be carried out without pressure. It is commendable, however, to operate at pressures up to 20 atmospheres, preferably from 2 to 10 atmospheres.

The residue which has been treated in this manner may be separated into pure terephthalic acid dimethyl ester and isophthalic acid dimethyl ester by a simple fractional crystallization in suitable solvents. The pure terephthalic acid dimethyl ester and isophthalic acid dimethyl ester so produced are free from oxidation by-products. The isophthalic acid dimethyl ester contains merely minor amounts of terephthalic acid dimethyl ester. A further advantage of this treatment resides in the fact that the oxidation by-products are predominantly reacted to terephthalic acid dimethyl ester, which later may be obtained by recrystallization of the oxidized and esterified residue in addition to the terephthalic acid dimethyl ester originally present in the residue. While only 20–30% of terephthalic acid dimethyl ester can be obtained from the evaporation residue not subjected to the treatment according to the present invention, 40–50% of terephthalic acid dimethyl ester can be obtained by a single recrystallization from a residue which has been treated by oxidation and esterification. Additionally, the terephthalic acid dimethyl ester obtained from the treated evaporation residue has a considerably higher degree of purity.

According to the present invention, the evaporation residue of the filtrate of the terephthalic acid dimethyl ester recrystallization is recrystallized in a suitable solvent after the above-described air oxidation and subsequent esterification. Aliphatic, aromatic and hydro-aromatic hydrocarbons as well as lower alcohols are particularly suitable solvents therefor. Usable aliphatic hydrocarbons are, for example, gasoline and those aliphatic hydrocarbons having from 6–12 carbon atoms; usable aromatic hydrocarbons are, for example, benzene, toluene and the isomer xylenes; usable hydro-aromatic hydrocarbons are, for example, cyclohexane, tetralin, and decalin; and usable lower alcohols are monohydric, saturated aliphatic alcohols, such as methanol, ethanol, propanol, and butanol.

During cooling, terephthalic acid dimethyl ester is crystallized first. Upon centrifugation thereof, the mother liquor is concentrated to 20–40% of the original volume. Thereby isophthalic acid dimethyl ester crystallizes together with approximately 8–12% terephthalic acid dimethyl ester. The crystals are centrifuged, preferably over a scale centrifuge, and subjected to a simple distillation for the purpose of removing colored impurities therefrom. A product is obtained in this manner which, as shown by its characterizing numbers, consists of approximately 90% isophthalic acid dimethyl ester and 10% terephthalic acid dimethyl ester. The mother liquor of the fractional crystallization is evaporated and the evaporation residue is partly added again to the starting product. Another portion of this residue is preferably removed from the process so as to avoid a concentration of non-oxidizable by-products.

A separation of the terephthalic acid-isophthalic acid dimethyl ester mixture, which is obtained by the process in accordance with the present invention, into terephthalic acid dimethyl ester and isophthalic acid dimethyl ester is possible only by repeated recrystallization in several solvents, for example, as disclosed and described in the process of the German Patent 1,055,521. However, the isophthalic acid dimethyl ester containing terephthalic acid dimethyl ester will preferably be used and employed where such separation is not required; such as, for instance, in the production of mixed polycondensates from tere- and isophthalic acid, or in the production of softeners.

The composition of the pure terephthalic acid-isophthalic acid diester mixtures obtained by the concentration of the mother liquor can be determined with the aid of a melting diagram of the system terephthalic acid dimethyl ester-isophthalic acid dimethyl ester from the melting point of the mixture. In isophthalic acid dimethyl ester-rich mixtures, it is preferable to add 20–30% pure terephthalic acid dimethyl ester thereto in order to be beyond the range of the eutectic.

It is an object of the present invention, therefore, to provide an improved process for the production of terephthalic acid dimethyl ester and isophthalic acid dimethyl ester, especially to increase the yield of terephthalic acid dimethyl ester obtained.

A further object of the present invention is the efficient production of such esters from residue products obtained by the oxidation of xylene and the esterification of the resulting acids.

Further objects will become apparent as the description of the invention proceeds.

The advantages of the present invention will become apparent from the following examples. In Example 1, an untreated product enriched with isophthalic acid dimethyl ester was recrystallized in methanol, while in Example 2, the same starting residue was treated by air oxidation and subsequent esterification of the resulting acids, as proposed by the present invention, and then recrystallized in methanol.

*Example I*

10 parts by weight of an evaporation residue which is enriched with isophthalic acid dimethyl ester is used as the starting material. This starting material is obtained as a result of the process for the production of terephthalic acid dimethyl ester in accordance with German Patent 1,041,945, wherein the resultant terephthalic acid dimethyl ester-isophthalic acid dimethyl ester fraction is recrystallized and the resultant mother liquor is evaporated to give the starting evaporation residue product of this example. This residue is heated with stirring to boiling whereby 15 parts by weight of terephthalic acid dimethyl ester are precipitated, which is suctioned off on a suction filter and then dried. This product has a setting point of 129.8° C. and is, accordingly, very impure. 1.1 parts by weight of a mixture of tetrephthalic acid dimethyl ester and isophthalic acid dimethyl ester are separated out from the filtrate during the evaporation thereof to 50% of its volume. This mixture is still strongly impure because of oxidation by-products, as shown by its saponification number of 527. The theoretical saponification number of terephthalic acid dimethyl ester and isophthalic acid dimethyl ester is 577.9. During further evaporation to 25% of the original volume, another 2.3 parts by weight of mixed product are precipitated, having a saponification number of 510. Upon complete distillation of the methanol, 3.9 parts by weight remain as residue, having a saponification number of 464. Distillation of the aforementioned 1.1 parts by weight of the mixture, being precipitated when the filtrate is concentrated to 50% of its volume, results in 0.7 part by weight of a product having a saponification number of 538.3 and a Hazen's color count of 120. This again is a complex mixture of terephthalic acid dimethyl ester, isophthalic acid dimethyl ester and oxidation by-products.

*Example II*

45.0 parts by weight of the same starting material as indicated in Example I are filled into an upright cylindrical V4A reaction tower, having a height of 2.5 m. and a diameter of 0.25 m., with the addition of 0.07 part by weight of a Co salt of first coconut fatty acids. 45 liters/minute of air are subsequently passed through the tower at a temperature of 150° C. and 2.0 atmospheres. The analysis of the outgoing air shows that the $O_2$ content drops to about 10% after a short induction period, but then slowly rises again to 20% in the course of from 2 to 3 hours. The reaction is completed after 3 and one-half hours and the product, having an acid number of about 50, is transferred into a V4A autoclave. The acid portions are esterified therein at 220° C. while passing 8 parts by weight of methanol vapor per hour therethrough. The pressure of the autoclave is kept at 25 atmospheres by cutting off methanol vapor. The acid number of the product is lowered to between 4 and 5 after 4 to 5 hours, and the esterification is stopped. The released methanol vapor is fractionated, condensed, and the condensed methanol- and water-free product is combined with the contents of the autoclave after the completion of the reaction. 43.7 parts by weight of an esterified product are obtained which has an acid number of 4.9. 10 parts by weight of this esterification product are recrystallized with methanol, as described in Example I. When operating in this manner, 4.28 parts by weight of terephthalic acid dimethyl ester are crystallized first, having a setting point of 140.35° C., which are suctioned off. By concentration to 75% of the volume, another 0.07 part by weight of terephthalic acid dimethyl ester, having a setting point of 128.0° C., are obtained from the filtrate. During further evaporation to 25% of the volume, 2.2 parts by weight of a mixture of terephthalic acid dimethyl ester and isophthalic acid dimethyl ester are precipitated, which has a saponification number of 577. By simple distillation of this latter mixer 2.0 parts by weight of a mixture with a saponification number of 578.0, an acid number of 0.02, and a Hazen's color count of 10 are obtained. The setting point of this product is 63.1° C. After the addition of 30% pure terephthalic acid dimethyl ester thereto, a setting point of 100.4° C. is obtained. With the acid of the melting point diagram of the terephthalic acid dimethyl ester-isophthalic acid dimethyl ester system, it is determined that the product has a composition of 92% of isophthalic acid dimethyl ester and 8% of terephthalic acid dimethyl ester. Upon complete evaporation, 4.4 parts by weight remain with a saponification number of 525.5.

*Example III*

10 parts by weight of the esterification product obtained according to Example II upon the described treatment with air and the subsequent esterifictaion with methanol are heated to the boiling point, while being stirred, with 25 parts by weight of normal gasoline having a boiling range of 86–112° C. After cooling of this mixture, 5.3 parts by weight of terephthalic acid dimethyl ester are precipitated which is suctioned off and dried. The product has a setting point of 127.2° C. When the mother liquor is concentrated to 75% of its volume, 2.3 parts by weight of a mixture of terephthalic acid dimethyl ester and isophthalic acid dimethyl ester are divided out of the filtrate. By distillation of this mixture, a product is obtained which has the following characterizing numbers: saponification number 578.0, acid number 0.4, setting point 63.9° C., Hazen's color count 20. Under the addition of 30% pure terephthalic acid dimethyl ester, a setting point of 99.8° C. is obtained, which corresponds to a connection of terephthalic acid dimethyl ester of 8.0%. When the filtrate is further evaporated to 25% of the original volume, no product is precipitated. A complete distillation of the methanol results in 2.4 parts by weight of residue.

*Example IV*

10 parts by weight of the esterification product obtained according to Example II upon the described treatment with air and the subsequent esterification with methanol are heated to the boiling point, while being stirred, with 25 parts by weight of mixed xylene (70% of m-xylene). When this mixture is cooled, 3.3 parts by weight of terepthalic acid dimethyl ester are precipitated which is suctioned off and dried. The product has a setting point of 139.7° C. When the mother liquor is concentrated to 75% of its volume, another 1.0 part by weight of terephthalic acid dimethyl ester are divided out of the filtrate, and the setting point thereof is 131.5° C. When evaporated further to 50% of the volume, 1.5 parts by weight of a mixture of terephthalic acid dimethyl ester and isophthalic acid dimethyl ester are precipitated. By distillation of this mixture, a product is obtained which has the following characterizing numbers: saponification number 577.5, acid number 0.2, setting point 61.5° C., Hazen's color count 20. By adding a 30% pure terephthalic acid dimethyl ester solution thereto, a setting point of 103.2° C. is obtained, which corresponds to a content of 10.5% terephthalic acid dimethyl ester. The filtrate, which still contains 4.2 parts by weight of dissolved constituents, is returned to the oxidation step.

*Example V*

45.0 parts by weight of the same starting residue as used in Example I are oxidized as in Example II after the additon of 0.05 part by weight of $KMnO_4$ thereto. The reaction is terminated after 4 hours. A product is obtained which has an acid number of 55 and which is esterified as indicated in Example II with the addition of 7.5 g. of ZnO as esterification catalyst. The acid number of the esterified product is 1.2.

*Example VI*

10 parts by weight of the esterification product obtained according to Example II after the described treatment with air and the subsequent esterification with methanol are heated to boiling with 25 parts by weight of cyclohexane while stirring. When this mixture is cooled to 30° C., 4.9 parts by weight of terephthalic acid dimethyl ester are precipitated which is suctioned off with a suction filter and dried. The product has a solidification, or freezing point, of 135° C. and a saponification number of 579. When its filtrate is evaporated to 25% of the volume, 2.7 parts by weight of a mixture of isophthalic acid dimethyl ester and terephthalic acid dimethyl ester are precipitated. By distillation of this mixture, a product is obtained which has the following characterizing numbers: solidification point 59.7° C.; saponification number 577; acid number 0.2; Hazen's color count 20. When a 30% terephthalic acid dimethyl ester solution is added thereto, a solidification point of 100.6° C. is obtained which corresponds to a content of 8.5% terephthalic acid dimethyl ester. The filtrate also contains 2.4 parts by weight of solid constitutes which can again be returned to the oxidation step.

*Example VII*

This example illustrates recycling of the starting residue through the entire process of the air oxidation of the xylene mixtures. 500 parts by weight of p-xylene with a para-content of 99.0–99.6% are used as the starting material, and the entire filtrate resulting from the recrystallization of the terephthalic acid dimethyl ester and isophthalic acid dimethyl ester fraction obtained therefrom is evaporated. 6 parts of the total of 50 parts of evaporation residue obtained are removed, while 44 parts are returned to the oxidation process. The return into the oxidation stage of the process is carried out in charges in such a manner that the concentration of the residue in the entire reaction mixture amounts to approximately 20%.

10 parts by weight of the removed evaporation residue are treated as described in Example II, whereby 4.30 parts by weight of terephthalic acid dimethyl ester and 1.3 parts by weight of a mixture of 92.0% isophthalic acid dimethyl ester and 8.0% of terephthalic acid dimethyl ester are obtained. Upon complete evaporation of the filtrate, there remain 4.4 parts by weight of residue.

The above examples and description are illustrative only, and are not to be interpreted in a limiting sense since changes may be made by one skilled in the art in carrying out the above process without departing from the scope of the invention as set forth in the appended claims.

We claim:

1. A process for producing terephthalic acid dimethyl ester and isophthalic acid dimethyl ester which comprises oxidizing a compound selected from the group consisting of p-xylene, m-xylene and mixtures thereof with an oxygen-containing gas, esterifying the resultant acids with methanol, separating a fraction rich in terephthalic acid dimethyl ester and isophthalic acid dimethyl ester from the resultant esterification product, recrystallizing said fraction to precipitate the major part of said terephthalic acid dimethyl ester, separating the resultant precipitate by filtration, evaporating the filtrate to leave an evaporation residue, oxidizing said evaporation residue with a gas containing molecular oxygen at a temperature of between approximately 130° and 200° C. in the presence of an oxidation catalyst selected from the group consisting of the salts of cobalt, manganese, cerium, thallium, copper, iron, zinc, titanium, chromium, nickel and mixtures thereof, esterifying the resultant oxidation product with methanol, and subsequently fractionally recrystallizing the resultant esterification product to obtain a precipitate of terephthalic acid dimethyl ester and a mother liquor rich in isophthalic acid dimethyl ester.

2. The process of claim 1, wherein said mother liquor rich in isophthalic acid dimethyl ester is concentrated in order to precipitate the isophthalic acid dimethyl ester and the remaining terephthalic acid dimethyl ester therefrom.

3. The process of claim 1, wherein the fractional recrystallization of the oxidized and esterified evaporation residue is carried out in the presence of methanol.

4. The process of claim 1, wherein said oxidation catalyst is selected from the group consisting of the cobalt and manganese salts of fatty acids.

5. The process of claim 4, wherein from 0.02 to 0.1% by weight of said oxidation catalyst is employed and wherein the oxidation of said evaporation residue is carried out under pressure.

6. The process of claim 1, wherein the oxidation of said evaporation residue is carried out at a temperature of between approximately 140° and 160° C.

7. The process of claim 1, wherein said evaporation residue is recycled through the process steps for the oxidation and esterification of the starting xylenes prior to being subjected to the said subsequent oxidation and esterification steps for the evaporation residue.

8. A process for producing terephthalic acid dimethyl ester and isophthalic acid dimethyl ester which comprises oxidizing a compound selected from the group consisting of p-xylene, m-xylene and mixtures thereof with an oxygen-containing gas esterifying the resultant acids with methanol, separating a fraction rich in terephthalic acid dimethyl ester and isophthalic acid dimethyl ester from the resultant esterification product, recrystallizing said fraction to precipitate the major part of said terephthalic acid dimethyl ester, separating the resultant precipitate by filtration, evaporating the filtrate to leave an evaporation residue, oxidizing said evaporation residue with a gas containing molecular oxygen at a temperature of between approximately 130° and 200° C. in the presence of from 0.02 to 0.1% by weight of an oxidation catalyst selected from the group consisting of the cobalt and manganese salts of fatty acids, esterifying the resultant oxidation product with methanol, frictionally recrystallizing the resultant esterification product to obtain a precipitate of terephthalic acid dimethyl ester and a mother liquor rich in isophthalic acid dimethyl ester, and concentrating said mother liquor in order to precipitate the isophthalic acid dimethyl ester and the remaining terephthalic acid dimethyl ester therefrom.

References Cited by the Examiner

UNITED STATES PATENTS 2,702,817  2/1955  Pino _____ 260—475
2,886,587  5/1959  Kolner _____ 260—475

FOREIGN PATENTS 538,415  3/1957  Canada.

LORRAINE A. WEINBERGER, Primary Examiner.

DURAL McCUTCHEN, Examiner.